United States Patent Office 2,875,239
Patented Feb. 24, 1959

2,875,239

INTERMEDIATES USEFUL IN THE SYNTHESIS OF α-LIPOIC ACID

Frederick W. Holly, Cranford, Arthur F. Wagner, Princeton, and Edward Walton and Carl H. Hoffman, Scotch Plains, N. J., assignors to Merck & Co., Inc., Rahway, N. J., a corporation of New Jersey No Drawing. Application February 19, 1957
Serial No. 641,013

9 Claims. (Cl. 260—481)

This invention is concerned with the production of novel 6,8-(hydrocarbon substituted mercapto)-5-oxocaprylic acids having the formula—

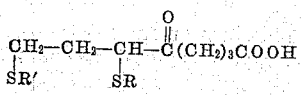

and salts and esters thereof, wherein R and R' are the same or different hydrocarbon substituents such as alkyl, alkenyl, alkynyl, aryl and aralkyl groups. This invention is also concerned with novel processes for producing these compounds in which α,γ-(hydrocarbon substituted mercapto)-butyryl halides are used as the starting materials. In addition, this invention is concerned with novel intermediates useful in producing the 6,8-(hydrocarbon substituted mercapto)-5-oxocaprylic acids.

This application is a continuation-in-part of our co-pending application Serial No. 396,334, filed December 4, 1953 now United States Patent No. 2,809,978.

The novel 6,8-(hydrocarbon substituted mercapto)-5-oxocaprylic acids are valuable in the production of other novel chemical compounds and are particularly important as precursors in the synthesis of α-lipoic acid or 5-[3-(1,2-dithiacyclopentyl)] pentanoic acid as will be shown hereinafter. In this regard 5-[3-(1,2-dithiacyclopentyl)] pentanoic acid is a valuable growth stimulating crystalline substance which was first obtained from liver and later found to have the structure—

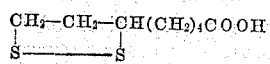

as disclosed in the J. Am. Chem. Soc. 74, 3455 (1952).

According to the present invention the novel 6,8-(hydrocarbon substituted mercapto)-5-oxocaprylic acids are produced by a process embodying a sequence of novel chemical reactions and in which novel chemical intermediates are produced. Thus, starting with an α,γ-(hydrocarbon substituted mercapto) butyryl halide and reacting it with a salt of a malonic acid diester there is produced the corresponding diester of 4,6-(hydrocarbon substituted mercapto)-2-carboxy-3-oxocaproic acid. This initial reaction is illustrated as follows:

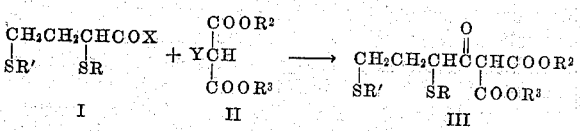

wherein X represents a halogen, Y represents an alkali metal, alkaline earth metal or alkoxymagnesium and R, R', R² and R³ represent the same or different hydrocarbon substituents such as alkyl, alkenyl, alkynyl, aryl and aralkyl groups.

The diesters of 4,6-(hydrocarbon substituted mercapto)-2-carboxy-3-oxocaproic acids are then converted to the corresponding 4,6-(hydrocarbon substituted mercapto)-3-oxocaproic acids and esters thereof according to the reactions—

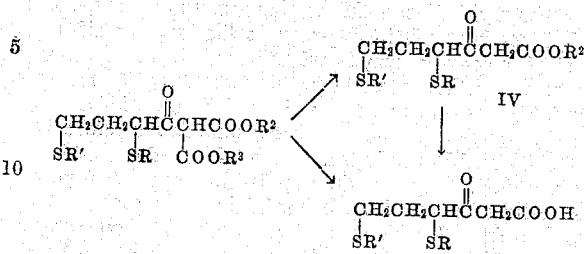

wherein R, R', R² and R³ have the significance previously assigned.

The 4,6-(hydrocarbon substituted mercapto)-3-oxocaproic acids are subsequently reacted in the form of an ester or salt with a suitable derivative of acrylic acid such as an amide, nitrile, ester or salt to form the corresponding derivative of 6,8-(hydrocarbon substituted mercapto)-4-carboxy-5-oxocaprylic acid, which reaction can be illustrated as follows:

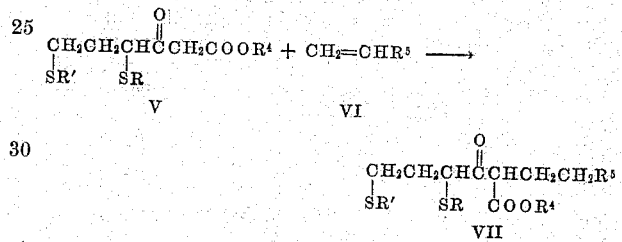

wherein R and R' have the meaning previously assigned, R⁴ represents an alkyl, aryl or aralkyl group or a metal and R⁵ represents the cyano, carbamyl and COOR⁴ groups wherein R⁴ has the same significance assigned herein.

The fourth and last reaction comprises a simultaneous hydrolysis and decarboxylation of the derivatives of the 6,8-(hydrocarbon substituted mercapto)-4-carboxy-5-oxocaprylic acids to produce the desired 6,8-(hydrocarbon substituted mercapto)-5-oxocaprylic acids as illustrated by the following reaction:

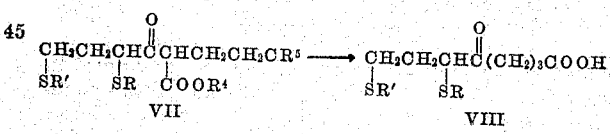

wherein R, R', R⁴ and R⁵ have the meaning given above.

The initial reaction of this process in which an α,γ-(hydrocarbon substituted mercapto)-butyryl halide (I) is reacted with a salt of a malonic acid diester (II) to prepare a diester of 4,6-hydrocarbon substituted mercapto)-2-carboxy-3-oxocaproic acid (III) may be conveniently achieved by contacting the reactants in the presence of an inert solvent. For this purpose, inert solvents such as the lower alkyl ethers like ethyl ether and isopropyl ether, chloroform, saturated hydrocarbons such as pentane and hexane, benzene and toluene are particularly suitable preferably when substantially free of water. The mixture of reactants in a suitable solvent is ordinarily heated to an elevated temperature to effect the reaction and, in this regard, the reflux temperature may be used with good results. Under these conditions the reaction is completed in less than one hour. Following completion of this reaction the desired diester of 4,6-(hydrocarbon substituted mercapto)-2-carboxy-3-oxocaproic acid may be isolated from the reaction mixture by conventional methods as distillative removal of the solvent. It is preferred, however, not to isolate this product from the reaction mixture but, instead to immediately subject the product present in the reaction mixture to conditions which effect decarboxylation of the 2-carboxy group according to methods hereinafter disclosed.

The described reaction may be conveniently effected using any suitable, α,γ-(hydrocarbon substituted mercapto)-butyryl halide as the starting material. Thus, the α,γ-hydrocarbon substituents may be the same or different alkyl, alkenyl, alkynyl, aryl and aralkyl radicals. In this regard, it is generally preferred to employ those compounds as starting materials which have identical hydrocarbon substituents. Such compounds are referred to herein as bis-substituted. In addition, the α,γ-bis-(lower alkylmercapto and lower alkenylmercapto) butyryl halides are particularly useful in the synthesis of α-lipoic acid. Specific examples of hydrocarbon substituents which may be present on these starting materials are methyl, ethyl, propyl, butyl, t-butyl, allyl, butenyl, pentenyl, heptenyl, ethynyl, propynyl-2, phenyl, benzyl and similar groups. In addition, this reaction is preferably achieved with halides of the type described in which the halogen substituent is either chlorine or bromine.

Salts of malonic acid diesters which may be used in this invention that might be mentioned are the alkoxy-magnesium derivatives of malonic acid diesters or the alkali metal and alkaline earth metal enolates. The ester groups of such salts may be either the same or different alkyl, aryl and aralkyl groups and are preferably lower alkyl groups. Some specific examples of such salts which may be used as reactants in this process are dimethyl methoxy magnesium malonate, diethyl ethoxy magnesium malonate, diphenyl and dibenzyl ethoxy magnesium malonate, ethyl t-butyl ethoxy magnesium malonate, and sodium, potassium, calcium and magnesium salts of dimethyl, diethyl, diphenyl, dibenzyl and similar mixed esters of malonic acid.

The reaction described may be used to prepare any desired diester of 4,6-(hydrocarbon substituted mercapto)-2-carboxy-3-oxocaproic acid. In a specific illustration of this reaction α,γ-bis(methylmercapto)-butyryl chloride is reacted with ethyl t-butyl ethoxy magnesium malonate to obtain tertiary butyl 4,6-bis(methylmercapto)-2-carbethoxy-3-oxocaproate. Examples of similar compounds which are prepared in this manner from the appropriate reactants are methyl-4,6-bis(ethylmercapto)-2-carbomethoxy-3-oxocaproate, ethyl-4,6-bis(ethylmercapto)-2-carbethoxy-3-oxocaproate, ethyl-4,6-bis(allylmercapto) - 2 - carbethoxy - 3 - oxocaproate, methyl-4,6 - bis(2 - methyl - 1 - ethyl - 2 - butene mercapto)-2-carbethoxy - 3 - oxocaproate, propyl - 4,6 - bis(3 - methyl-2 - ethyl - 2 pentene mercapto) - 2 - carbomethoxy-3-oxocaproate, phenyl-4,6-bis(phenylmercapto)-2-carbophenoxy-3-oxocaproate, ethyl-4,6-bis(benzylmercapto)-2-carbethoxy-3-oxocaproate, benzyl-4,6-bis(propargylmercapto)-2-carbobenzyloxy-3-oxocaproate, methyl-4-ethylmercapto - 6 - propylmercapto - 2 - carbomethoxy - 3 - oxocaproate, and the like.

According to the second step of this process the diesters, preferably the lower alkyl diesters, of the 4,6-(hydrocarbon substituted mercapto)-2-carboxy-3-oxocaproic acids (III) produced above are converted to the corresponding mono-esters of 4,6-(hydrocarbon substituted mercapto)-3-oxocaproic acid (IV). This conversion in which the 2-carboxy group is eliminated from the caproic acid moiety is attained by either an acid catalyzed reaction or by thermal decarboxylation to the desired product.

Acid catalyzed decarboxylation is preferably achieved under solvent conditions in the presence of a suitable acid. Thus, this reaction is conveniently effected by contacting the diester of the 4,6-(hydrocarbon substituted mercapto)-2-carboxy-3-oxocaproic acid in inert solvents such as ethers, benzene, hexane, chloroform and the like with catalytic amounts of acids such as alkyl and aryl sulfonic acids and particularly para-toluene sulfonic acid. In this regard, the use of substantially anhydrous conditions is sometimes preferably for optimum results. Elevated temperatures above 50° C. and up to the reflux temperature are used for the decarboxylation. Under such conditions the reaction is completed in an hour or two and the product formed may be recovered from the reaction mixture by the usual methods. Thus, the solvent may be evaporated and the oily product purified by distillation under reduced pressure.

More specifically, this transformation is illustrated by the conversion of t-butyl-4,6-(methylmercapto)-2-carbethoxy-3-oxocaproate in benzene at reflux temperature to ethyl-4,6-bis(methylmercapto)-3-oxocaproate. Representative of other similar compounds which are produced according to this decarboxylation reaction from the appropriate reactants are methyl-4,6-bis(ethylmercapto)-3-oxocaproate, ethyl-4,6-bis(ethylmercapto)-3-oxocaproate, oxocaproate, ethyl - 4,6 - bis(allylmercapto) - 3 - oxocaproate, methyl-4,6-bis(2-methyl-1-ethyl-2-butene mercapto)-3-oxocaproate, propyl-4,6-bis(3-methyl-2-ethyl-2-pentene mercapto)-3-oxocaproate, phenyl-4,6-bis(phenylmercapto)-3-oxocaproate, ethyl-4,6-bis(benzylmercapto)-3-oxocaproate, benzyl-4,6-bis(propargylmercapto)-3-oxocaproate, methyl-4-ethylmercapto-6-propylmercapto-3-oxocaproate and the like.

As has been indicated above, this decarboxylation is also effected by thermal cracking. According to this procedure diesters of the 4,6-(hydrocarbon substituted mercapto)-2-carboxy-3-oxocaproic acids are heated at a suitable elevated temperature, preferably in the neighborhood of about 150-300° C., to accomplish removal of the 2-carboxy group and form the corresponding mono-esters. After the conversion has been accomplished the product may be recovered by conventional methods and purified. By proper selection of the reactants those mono-esters previously named herein and other similar compounds can be produced by this procedure.

The esters of 4,6-(hydrocarbon substituted mercapto)-3-oxocaproic acids are readily converted to the corresponding alkali metal and alkaline earth metal salts such as sodium, potassium, calcium and magnesium salts by hydrolysis of the ester with an alkali or alkaline earth metal base. The salts in turn are converted to the free acids by hydrolysis with mineral acids such as hydrochloric acid and sulfuric acid.

The third reaction of this process is directed to the production of various derivatives of 6,8-(hydrocarbon substituted mercapto)-4-carboxy-5-oxocaprylic acids such as nitriles, amides, diesters and dimetal salts thereof (VII). Such compounds may be conveniently prepared by reacting an ester or salt of a 4,6-(hydrocarbon substituted mercapto)-3-oxocaproic acid (V) prepared as above with a derivative of acrylic acid (VI) under suitable reaction conditions. This reaction may be readily effected by contacting the reactants in the presence of a suitable solvent, preferably an alcohol such as the lower alcohols like methanol and ethanol. Ordinarily a small amount of a quaternary ammonium hydroxide such as trimethyl benzyl ammonium hydroxide (Triton B) or an alkali metal alkoxide is added to the mixture to promote the reaction. To prevent undue side effects the temperature is ordinarily controlled below 60° C. After the reactants have been combined, preferably using approximately equimolar amounts of each reactant, the mixture is continually stirred for 12 to 60 hours during which time an elevated temperature below 60° C. is maintained. Upon completion of the reaction the desired product may be recovered from the reaction mixture by extraction with an immiscible solvent such as chloroform, evaporation of the solvent and distillation of the product under reduced pressure.

This reaction is conveniently effected with any suitable derivative of acrylic acid such as acrylonitrile, acrylamide and esters and salts of acrylic acid such as the alkyl, aryl and aralkyl esters and alkali metal and alkaline earth metal salts thereof. More specifically, the methyl, ethyl, propyl, butyl, phenyl and benzyl esters and sodium, potassium, magnesium and calcium salts of acrylic acid are examples of compounds which may be used in this reaction.

Specifically illustrative of this method is the reaction of ethyl-4,6-bis(methylmercapto)-3-oxocaproate with methyl acrylate to produce methyl-6,8-bis(methylmercapto)-4-carbethoxy-5-oxocaprylate. Other examples of closely related compounds that are incorporated within the scope of this invention which are produced according to this method from the appropriate reactants are ethyl-6,8-bis(ethylmercapto)-4-carbomethoxy-5-oxocaprylate, ethyl-6,8-bis(ethylmercapto)-4-carbethoxy-5-oxocaprylate, methyl-6,8-bis(methylmercapto)-4-carbomethoxy-5-oxocaprylate, phenyl-6,8-bis(phenylmercapto)-4-carbethoxy-5-oxocaprylate, benzyl-6,8-bis(propylmercapto)-4-carbophenoxy-5-oxocaprylate, methyl-6,8-bis(allylmercapto)-4-carbethoxy-5-oxocaprylate, ethyl-6,8-bis(2-methyl-1-ethyl-2-butene mercapto)-4-carbomethoxy-5-oxocaprylate, propyl-6,8-bis(3-methyl-2-ethyl-2-pentenemercapto)-4-carbopropoxy-5-oxocaprylate, ethyl-6,8-bis(propynylmercapto)-4-carbethoxy-5-oxocaprylate, methyl-6-ethylmercapto-8-propylmercapto-4-carbomethoxy-5-oxocaprylate and alkali metal and alkaline earth metal salts such as the sodium and potassium, calcium and magnesium salts and the nitrile and amide of these and similar compounds. The free acids of such compounds are readily obtained by hydrolysis of the nitrile, amide, esters and salts according to conventional methods.

The last reaction in this process comprises the combined hydrolysis and decarboxylation of a derivative of 6,8-hydrocarbon substituted mercapto)-4-carboxy-5-oxocaprylic acid (VII), such as described above, to the corresponding 6,8-(hydrocarbon substituted mercapto)-5-oxocaprylic acid (VIII). This reaction may be conveniently carried out by treating the reactant with a suitable mineral acid, preferably in the presence of a carboxylic acid. The reaction, however, is preferably run in a mixture of glacial acetic acid and hydrochloric acid since the product can be readily recovered by distillation of such acids. The reaction proceeds at room temperature although elevated temperatures are also used with satisfactory results. Under such conditions the reaction is completed in from about 6 to about 60 hours. The reaction product is readily recovered from the mixture according to conventional methods such as evaporation and extraction with a suitable solvent such as chloroform.

The described reaction is specifically illustrated by the conversion of methyl-6,8-bis(methylmercapto)-4-carbethoxy-5-oxocaprylate in the presence of a mixture of hydrochloric acid and glacial acetic acid to 6,8-bis(methylmercapto)-5-oxocaprylic acid. In a similar manner other compounds such as 6,8-bis(ethylmercapto)-5-oxocaprylic acid, 6,8-bis(propylmercapto)-5-oxocaprylic acid, 6,8-bis(butylmercapto)-5-oxocaprylic acid, 6,8-bis(phenylmercapto)-5-oxocaprylic acid, 6,8-bis(benzylmercapto)-5-oxocaprylic acid, 6,8-bis(allylmercapto)-5-oxocaprylic acid, 6,8-bis(2-methyl-1-ethyl-2-butene mercapto)-5-oxocaprylic acid, 6,8-bis(3-methyl-2-ethyl-2-pentene mercapto)-5-oxocaprylic acid, 6,8-bis(propargylmercapto)-5-oxocaprylic acid, 6-ethylmercapto-8-propylmercapto-5-oxocaprylic acid and the like are prepared by the proper selection of reactants.

Esters of the 6,8-(hydrocarbon substituted mercapto)-5-oxocaprylic acids are conveniently prepared by reacting such compounds with a suitable halogenating agent to form the corresponding acyl halide and subsequently reacting the acyl halide with an alkanol, aryl alcohol or aralkanol to obtain the desired ester. The acyl halides of the 6,8-(hydrocarbon substituted mercapto)-5-oxocaprylates may be conveniently prepared by known methods such as by reacting the acid with halogenating agents such as thionyl chloride, phthalyl chloride, phosphorus trichloride, thionyl bromide and phosphorus tribromide in the presence of conventional solvents or an excess of the halogenating agent if it is a liquid. This halogenation may be achieved at 0–10° C. or at a more elevated temperature if desired. After the acyl halide has been prepared it is recovered from the reaction mixture and esterified by reaction with an excess of the appropriate alcohol under acidic conditions. The esters formed in this manner are recovered from the reaction mixture by ordinary procedures.

Examples of some 6,8-(hydrocarbon substituted mercapto)-5-oxocaprylic acid esters which may be prepared from the corresponding acid and intermediate acyl halides such as the bromide and chloride that might be mentioned are methyl-6,8-bis(methylmercapto)-5-oxocaprylate, methyl-6,8-bis(ethylmercapto)-3-oxocaprylate, ethyl-6,8-bis(ethylmercapto)-5-oxocaprylate, benzyl-6,8-bis(propylmercapto)-5-oxocaprylate, propyl-6,8-bis(butylmercapto)-5-oxocaprylate, phenyl-6,8-bis(phenylmercapto)-5-oxocaprylate, methyl-6,8-bis(benzylmercapto)-5-oxocaprylate, methyl-6,8-bis(allylmercapto)-5-oxocaprylate, ethyl-6,8-bis(propargylmercapto)-5-oxocaprylate, methyl-6-ethylmercapto-8-propylmercapto-5-oxocaprylate and the like.

Lower alkyl esters are also conveniently produced by reacting a 6,8-(hydrocarbon substituted mercapto)-5-oxocaprylic acid with a diazoalkene, such as diazomethane or diazoethane, in a suitable dry inert solvent such as ether, chloroform or benzene. Esters may also be produced by reacting the acid with a suitable alcohol under acidic conditions according to the classical method of producing esters. The resulting esters, like the acids are water insoluble oils which may be purified by distillation under reduced pressure.

In addition to esters, salts of the 6,8-(hydrocarbon substituted mercapto)-5-oxocaprylic acids may also be produced. For example, the alkali metal and alkaline earth metal salts may be prepared by contacting a suitable organic solvent solution of a 6,8-(hydrocarbon substituted mercapto)-5-oxocaprylic acid with an aqueous solution of an alkali metal or alkaline earth metal hydroxide, bicarbonate or carbonate. The salt is readily recovered from the aqueous phase by evaporation to dryness. In this manner, salts such as the sodium, potassium, calcium and magnesium salts of 6,8-(hydrocarbon substituted mercapto)-5-oxocaprylic acids, such as those specifically named hereinbefore, may be prepared.

According to a further embodiment of this invention diesters of 6,8-(hydrocarbon substituted mercapto)-4-carboxy-5-oxocaprylic acids may also be produced by reacting an ester of a 4,6-(hydrocarbon substituted mercapto)-3-oxocaproic acid with an ester of a β-halo propionic acid. This reaction may be illustrated as follows:

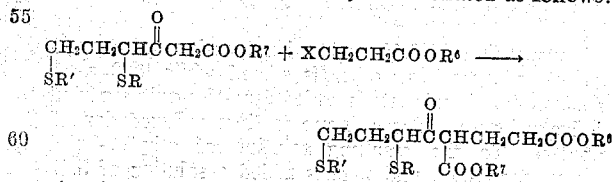

wherein R and R' represent the same or different hydrocarbon substituents such as alkyl, alkenyl, alkynyl, aryl and aralkyl groups, and R⁷ and R⁶ represent the same or different alkyl, aryl and aralkyl groups, and X is halogen.

This reaction is preferably effected by contacting the reactants in the presence of a suitable inert organic solvent which is anhydrous or substantially free of water. Among the solvents which may be used for this purpose are ethereal solvents such as dioxane, tetrahydrofuran and ether alcohols such as methanol and ethanol, benzene, toluene and hexane. Approximately, equimolar quantities of the reactants are preferably employed in the reaction together with about equimolar quantity of an enolizing agent such as sodamide, sodium triphenylmethyl and sodium and potassium alkoxides such as methoxide or ethoxide. The reaction is conveniently accomplished at elevated temperatures such as the reflux temperatures of the mixture. Under such conditions the reaction is ordinarily completed in from about one to five hours, usually two hours being entirely adequate. Following completion of the reaction the mixture is preferably acidified with a mineral acid such as sulfuric acid or hydrochloric acid to decompose any excess base present and to aid the recovery of the desired product. The product may then be recovered according to the ordinary techniques.

This reaction is conveniently accomplished employing esters of β-halo propionic acid in which the ester substituent is an alkyl, aryl or aralkyl group such as methyl, ethyl, propyl, phenyl and benzyl radicals and in which the β-halo substituent is chlorine or bromine.

The application of this alternative procedure may be conveniently used to prepare those diesters of 6,8-(hydrocarbon substituted mercapto)-4-carboxy-5-oxocaprylic acids previously disclosed herein and other similar novel compounds.

The 6,8-(hydrocarbon substituted mercapto)-5-oxocaprylic acids produced according to the present invention may be converted to 5-[3-(1,2-dithiacyclopentyl)] pentanoic acid, also called α-lipoic acid, by the utilization of a process which is the joint invention of Holly and Wagner and is disclosed in United States patent application Serial No. 396,333, filed December 4, 1953. This process comprises essentially reacting a 6,8-(hydrocarbon substituted mercapto)-5-oxocaprylic acid with an alkali metal borohydride to produce the corresponding 6,8-(hydrocarbon substituted mercapto)-5-hydroxy caprylic acid which immediately forms the corresponding 5-membered lactone, reducing said lactone with phosphorous-iodine to produce a 6,8-(hydrocarbon substituted mercapto) caprylic acid, and reacting said compound with dealkylating agents such as 50% sulfuric acid or thiouronium bromide and oxidizing the resulting material with $I_2$—KI to obtain 5-[3-(1,2-dithiacyclopentyl)] pentanoic acid.

In the practice of the present invention, the α,γ-(hydrocarbon substituted mercapto) butyryl halides which are used as starting materails may be conveniently prepared according to novel methods disclosed in the United States patent application of Arthur F. Wagner, Serial No. 369,535, filed July 21, 1953, now U. S. Patent No. 2,842,587.

The following examples are given for purposes of illustration and not by way of limitation:

EXAMPLE 1

*Tertiary butyl-4,6-bis(methylmercapto)-2-carbethoxy-3-oxocaproate*

A suspension of 0.10 mole of magnesium ethylate in 100 ml. of anhydrous ether is stirred while 0.10 mole of ethyl t-butyl-malonate is added dropwise over a period of five minutes. The mixture is then refluxed for 15 minutes. To the resulting solution of ethyl t-butyl ethoxy magnesium malonate is added a solution of 0.12 mole of α,γ-bis(methylmercapto) butyryl chloride in 75 ml. of ether over a ten minute period. The mixture is then refluxed for 15 minutes and cooled. The mixture containing t-butyl-4,6-bis(methylmercapto)-2-carbethoxy-3-oxocaproate is diluted wtih 60 ml. of water and acidified with 20 ml. of 2 N sulfuric acid. The ether phase is separated and the aqueous phase is extracted with ether. The combined ether extracts are washed with water, dried over anhydrous magnesium sulfate, and the ether removed. Final traces of water are removed by azeotropic distillation with benzene.

The α,γ-bis(methylmercapto) butyryl chloride used in this example may be conveniently prepared according to the following representative procedures using oxallyl chloride and thionyl chloride as the halogenating agents:

A. About 10.7 grams of sodium α,γ-bis(methylmercapto) butyrate is suspended in 35 ml. of dry benzene and cooled in an ice bath. To this mixture is added 10.2 grams of oxallyl chloride over a ten minute period and the mixture is stirred for one hour at ice bath temperatures. The mixture is then evaporated under reduced pressure at a temperature below 15° C. The residue is treated with two 75-ml. portions of ether, the ether extracts filtered and evaporated under reduced pressure to give α,γ-bis(methylmercapto) butyryl chloride as an oil.

B. About 13.29 grams of α,γ-bis(methylmercapto) butyric acid is cooled in an ice bath and 9.7 grams of thionyl chloride added thereto. After standing at about 0° C. for one hour the mixture is evaporated at room temperature under reduced pressure to remove thionyl chloride and volatile side products. The α,γ-bis(methylmercapto) butyryl chloride is obtained as an oil.

EXAMPLE 2

*Tertiary butyl - 4,6 - bis(t - butylmercapto) - 2 - carbethoxy-3-oxocaproate*

In 100 ml. of anhydrous ether 18.8 grams of ethyl t-butyl malonate is reacted with 11.4 grams of magnesium ethylate to produce ethyl t-butyl ethoxy magnesium malonate. To this solution is then added 33.8 grams of α,γ-bis(t-butylmercapto) butyryl chloride in 100 ml. of ether and the mixture refluxed for one hour. Tertiary butyl-4,6-bis(t-butylmercapto)-2-carbethoxy-3-oxocaproate is obtained and is isolated as in Example 1.

EXAMPLE 3

*Tertiary butyl - 4,6 - bis(allylmercapto) - 2 - carbethoxy-3-oxocaproate*

To 200 ml. of anhydrous ethyl ether is added 37.6 grams of ethyl t-butyl malonate and 22.2 grams of magnesium ethylate. The mixture is refluxed for 30 minutes and to the solution of ethyl t-butyl ethoxy magnesium malonate is added 55 grams of α,γ-bis(allylmercapto) butyryl chloride in 100 ml. of ether. The mixture is refluxed for 30 minutes, cooled and t-butyl-4,6-bis(allylmercapto)-2-carbethoxy-3-oxocaproate isolated as described in Example 1.

EXAMPLE 4

*Tertiary butyl - 4,6 - bis(benzylmercapto) - 2 - carbomethoxy - 3 - oxocaproate*

Following the procedure of Example 1, 26.1 grams of methyl t-butyl malonate is reacted with 17.1 grams of magnesium ethylate in 100 ml. of ether to form methyl t-butyl ethoxy magnesium malonate. The mixture in turn is combined with 59.6 grams of α,γ-bis(benzylmercapto) butyryl chloride in 100 ml. of ether and reacted according to this procedure to produce t-butyl-4,6-bis-(benzylmercapto)-2-carbomethoxy-3-oxocaproate.

EXAMPLE 5

*Ethyl-4,6-bis(methylmercapto)-3-oxocaproate*

After substantially all the water is removed from the t - butyl - 4,6 - bis(methylmercapto) - 2 - carbethoxy - 3 - oxocaproate prepared as in Example 1 the benzene solution is allowed to cool and one gram of anhydrous p-toluene sulfonic acid is added. The acidic solution is refluxed for 1½ hours after the initial vigorous evolution of isobutylene and carbon dioxide has ceased. The benzene solution is then washed with saturated aqueous sodium bicarbonate and with water. The benzene solution is dried over magnesium sulfate and the benzene removed by evaporation under reduced pressure. The oily residue is distilled to obtain ethyl-α,γ-bis(methylmercapto)-3-oxocaproate; boiling point 110–114°C./.05 mm;

$n_D^{25.5}=1.5088$; λ max.=2940 A. (E%=480) and 2460 A. (E%=1220); molecular weight found 255±3 (calc. 250).

EXAMPLE 6

*Ethyl-4,6-bis(t-butylmercapto)-3-oxocaproate*

To 30 grams of t-butyl-4,6-bis(t-butylmercapto)-2-carbethoxy-3-oxocaproate in 100 ml. of anhydrous benzene is added 1.5 grams of p-toluene sulfonic acid and the mixture refluxed for two hours. Ethyl-4,6-bis(t-butylmercapto)-3-oxocaproate is formed and recovered as in Example 5.

EXAMPLE 7

*Ethyl-4,6-bis(allylmercapto)-3-oxocaproate*

To 30 grams of t-butyl-4,6-bis(allylmercapto)-2-carbethoxy-3-oxocaproate in 200 ml. of benzene substantially free of water is added 3 grams of p-toluenesufonic acid. The benzene solution is refluxed for two hours, washed with aqueous sodium bicarbonate and dried over magnesium sulfate. Ethyl-4,6-bis(allylmercapto)-3-oxocaproate is recovered by evaporating the benzene.

EXAMPLE 8

*Tertiary butyl-4,6-bis(benzylmercapto)-3-oxocaproate*

About 40 grams of t-butyl-4,6-bis(benzylmercapto)-2-carbomethoxy-3-oxocaproate is dissolved in 150 ml. of anhydrous benzene and two grams of p-toluenesulfonic acid is added. Reaction is effected as in Example 5 to produce t-butyl-4,6-bis(benzylmercapto)-3-oxocaproate which is recovered as therein disclosed.

EXAMPLE 9

*Methyl - 6,8 - bis(methylmercapto) - 4 - carbethoxy - 5- oxocaprylate*

A solution of 20 grams of ethyl-4,6-bis(methylmercapto)-3-oxocaproate and five grams of 30% methanolic trimethyl benzyl ammonium hydroxide (Triton B) is stirred while seven grams of methyl acrylate is added over a 15-minute period. During this addition the temperature rises to about 35° C. and soon increases to 50° C. The reaction is held at about 50° C. for 48 hours after which it is cooled and extracted with chloroform. The chloroform solution is washed with 50 ml. of 1 N hydrochloric acid, water and finally dried over anhydrous magnesium sulfate. The ether is removed and the residual oil is distilled to obtain methyl-6,8-bis-methylmercapto)-4-carbethoxy-5-oxocaprylate.

EXAMPLE 10

*Methyl - 6,8 - bis(t - butylmercapto) - 4 - carbethoxy - 5- oxocaprylate*

A methanol solution of 25.1 grams of ethyl-4,6-bis(t-butylmercapto)-3-oxocaproate is prepared and to it is added 6.4 grams of methyl acrylate and 4 grams of 30% methanolic trimethyl benzyl ammonium hydroxide. The mixture is maintained at about 50° C. for 20 hours and the methyl-6,8-bis(t-butylmercapto)-4-carbethoxy-5-oxocaprylate recovered by the procedure of Example 9.

EXAMPLE 11

*Methyl-6,8-bis(allylmercapto)-4-carbethoxy-5-oxocaprylate*

To a solution of 36 grams of ethyl-4,6-bis(allylmercapto)-3-oxocaproate in methanol is added 10.5 grams of methyl acrylate and 7 grams of 30% methanolic trimethyl benzyl ammonium hydroxide. The mixture is kept at about 50° C. for one day and then extracted with ether. The product is worked up in the usual manner to obtain methyl-6,8-bis(allylmercapto)-4-carbethoxy-5-oxocaprylate.

EXAMPLE 12

*Methyl-6,8-bis(benzylmercapto)-4-carbo-t-butoxy-5-oxocaprylate*

By reacting 19.4 grams of 5-butyl-4,6-bis(benzylmercapto)-3-oxocaproate with 4.3 grams of methyl acrylate in ethanol in the presence of 3 grams of 30% methanolic trimethyl benzyl ammonium hydroxide according to Example 9 there is produced methyl-6,8-bis(benzylmercapto)-4-carbo-t-butoxy-5-oxocaprylate which may be isolated according to conventional procedures.

EXAMPLE 13

*6,8-bis(methylmercapto)-5-oxocaprylic acid*

A solution of 6.8 grams of methyl-6,8-bis(methylmercapto)-4-carbethoxy-5-oxocaprylate in 100 ml. of glacial acetic acid and 24 ml. of concentrated hydrochloric acid is prepared and allowed to stand at room temperature for 48 hours. The mixture is concentrated under reduced pressure, the residue extracted with aqueous sodium bicarbonate, the extract acidified and extracted with chloroform. The chloroform is removed and the residue is dissolved in 50 ml. of cold 1 N sodium hydroxide and allowed to stand at about 6° C. overnight. The mixture is acidified to pH 3 with concentrated hydrochloric acid and extracted with chloroform. The chloroform is removed and the product heated at 80–85° C. for 1½ hours to eliminate carbon dioxide. The resulting 6,8-bis(methylmercapto)-5-oxocaprylic acid has ultra violet absorption maxima at 2390 A. (E%=27.7) and 2970 A. (E%=15.5).

EXAMPLE 14

*6,8-bis(t-butylmercapto)-5-oxocaprylic acid*

Methyl - 6,8 - bis(t - butylmercapto) - 4 - carbethoxy-5-oxocaprylate is reacted according to the method of Example 13 to form 6,8-bis(t-butylmercapto)-5-oxocaprylic acid.

EXAMPLE 15

*6,8-bis(allylmercapto)5-oxocaprylic acid*

Ten grams of methyl-6,8-bis(allylmercapto)-4-carbethoxy-5-oxocaprylate is added to an aqueous hydrochloric acid solution and the mixture is allowed to stand for one day. The aqueous mixture is extracted with chloroform and by evaporating the chloroform solution 6,8-bis(allylmercapto)-5-oxocaprylic acid is isolated.

EXAMPLE 16

*6,8-bis(benzylmercapto)-5-oxocaprylic acid*

Five grams of methyl-6,8-bis(benzylmercapto)-4-carbomethoxy-5-oxocaprylate is added to a mixture of 75 ml. of glacial acetic acid and 20 ml. of concentrated sulfuric acid and the mixture allowed to stand. 6,8-bis(benzylmercapto)-5-oxocaprylic acid is formed and recovered as in Example 13.

EXAMPLE 17

*Methyl-6,8-bis(methylmercapto)-4-carbethoxy-5-oxocaprylate using methyl-β-chloropropionate*

To a solution of 4.5 grams of sodium methoxide in 100 ml. of methanol is added 20 grams of ethyl-4,6-bis(methylmercapto)-3-oxocaproate. The resulting solution is refluxed and to it is added 9.8 grams of methyl-β-chloropropionate over a ten-minute period. Refluxing is continued for two hours with stirring. The mixture is cooled and acidified to pH 3–4 with a cold solution of hydrochloric acid. The acidified mixture is diluted with ice water and extracted with chloroform. The chloroform extracts are washed with water and dried over anhydrous magnesium sulfate. The chloroform is evaporated and the residual oil distilled to give substantially pure methyl 6,8 - bis(methylmercapto)-4-carbethoxy - 5 - oxocaprylate; boiling point 150–160° C./50 mm., $n_D^{25}$=1.5028.

Any departure from the above description which con-

What is claimed is:

1. A compound having the structural formula:

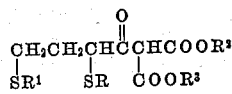

wherein R and R¹ are selected from the class consisting of lower alkyl, lower alkenyl, phenyl and benzyl groups, and R² and R³ are lower alkyl groups.

2. A lower alkyl diester of 4,6-bis(loweralkylmercapto)-2-carboxy-3-oxocaproic acid.

3. Tertiary butyl - 4,6 - bis(benzylmercapto) - 2 - carbomethoxy-3-oxocaproate.

4. Tertiary butyl-4,6-bis(methylmercapto)-2-carbethoxy-3-oxocaproate.

5. Tertiary butyl-4,6-bis(allylmercapto)-2-carbethoxy-3-oxocaproate.

6. The process which comprises heating a compound having the formula:

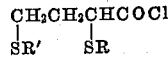

with a compound having the formula:

thereby producing a compound having the formula:

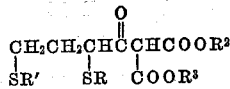

wherein Y is a member of the class consisting of alkoxy magnesium, alkali metal, and alkaline earth metal substituents, R and R' are selected from the class consisting of lower alkyl, lower alkenyl, phenyl and benzyl groups, and R² and R³ are members of the class consisting of alkyl, aryl and aralkyl groups.

7. The process which comprises heating a α,γ-bis(loweralkylmercapto) butyryl chloride with a compound having the formula:

to produce a 4,6-bis(loweralkylmercapto)-2-carboxy-3-oxocaproic acid diester wherein Y is a member of the class consisting of alkoxy megnesium, alkali metal and alkaline earth metal substituents, and R² and R³ are lower alkyl.

8. The process which comprises heating α,γ-bis(methylmercapto) butyryl chloride with a compound having the formula:

to produce a 4,6-bis(methylmercapto)-2-carboxy-3-oxocaproic acid diester wherein Y is a member of the class consisting of alkoxy magnesium alkali metal and alkaline earth metal substituents, and R² and R³ are lower alkyl.

9. The process which comprises heating α,γ-bis(allylmercapto) butyryl chloride with a compound having the formula:

to produce a 4,6-bis(allymercapto)-2-carboxy-3-oxocaproic acid diester wherein Y is a member of the class consisting of alkoxy magnesium alkali metal and alkaline earth metal substituents, and R² and R³ are lower alkyl.

References Cited in the file of this patent

Walker et al.: J. A. C. S., vol. 68, pp. 1386–9 (1952).